Patented July 27, 1926.

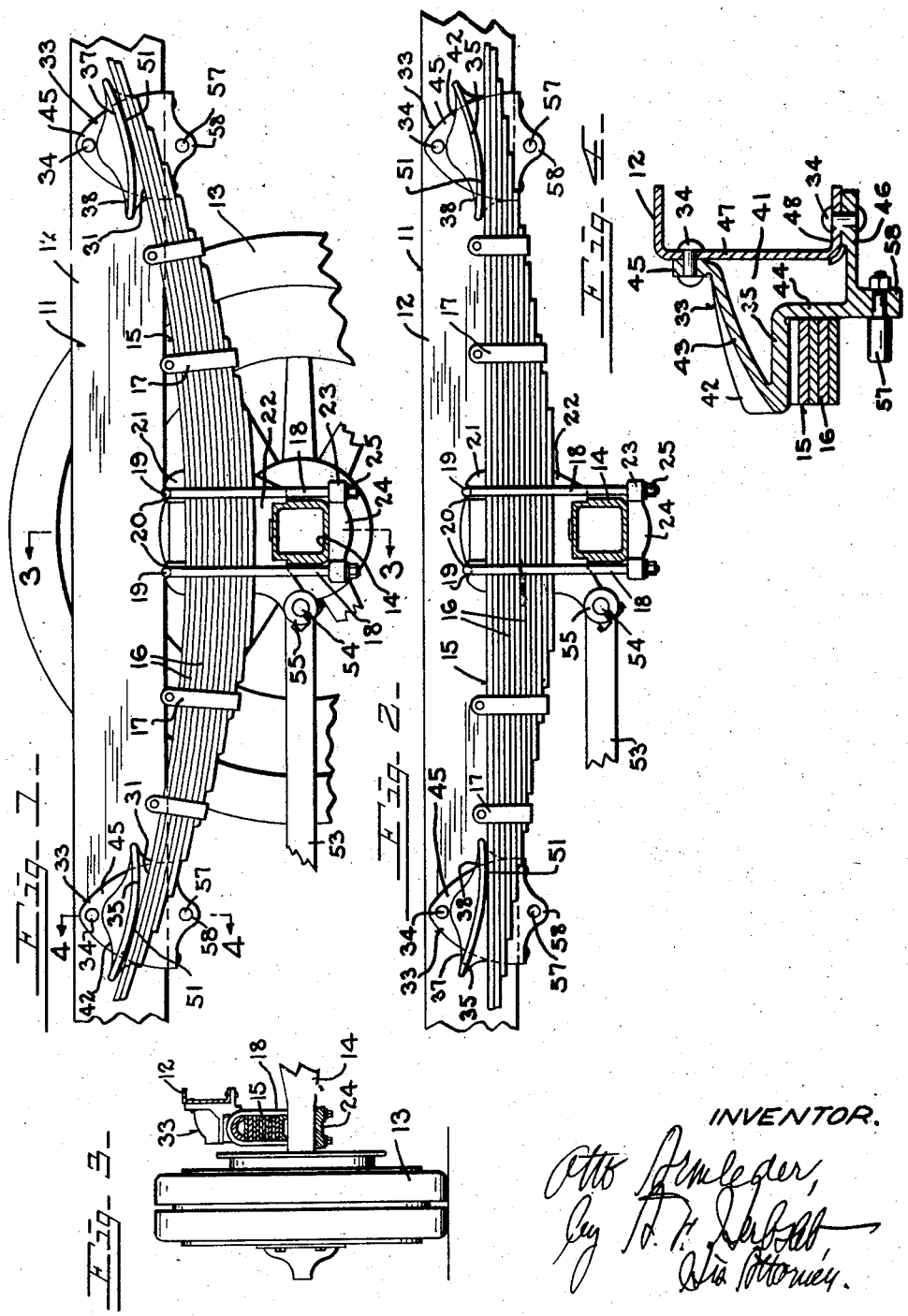

1,594,145

UNITED STATES PATENT OFFICE.

OTTO ARMLEDER, OF WYOMING, OHIO, ASSIGNOR TO THE O. ARMLEDER MOTOR TRUCK COMPANY, OF CINCINNATI, OHIO, A CORPORATION OF OHIO.

SPRING MOUNTING FOR VEHICLES.

Application filed November 28, 1924. Serial No. 752,626.

My invention relates to spring mounting for vehicles, and has for its object the provision of novel means for mounting the body of the vehicle upon the spring, and, further, the provision of novel arrangement of contact-faces between the body and spring whereby the greatest resilience in the spring is effective when the vehicle is under no load or light load condition and whereby heavier portions of the spring become progressively effective in increasing ratio as the load increases.

The invention will be further readily understood from the following description and claims, and from the drawing, in which latter:—

Fig. 1 represents a side elevation of my improved spring mounting under no-load condition, parts being broken away.

Fig. 2 is a similar view, showing the relations of the parts under full-load condition.

Fig. 3 is a cross-section, taken in the plane of the line 3—3 of Fig. 1; and,

Fig. 4 is a detail in cross-section, taken on the line 4—4 of Fig. 1.

The body of the vehicle comprises a usual chassis 11, shown partly broken away, and comprises a side bar 12, shown as a channel-bar, of suitable metal. The wheels 13 are mounted on a suitable axle 14, extending crosswise underneath the body, for receiving wheels at the respective ends thereof.

At each side of the body there is a spring 15. This spring is exemplified as comprising leaves 16, which are suitably connected together for assembled relation, as by clips 17, which permit relative lengthwise sliding movement between the leaves. The spring is secured to the axle, for instance by U-bolts 18, the loop-ends 19 of which are received in slots 20 of yokes 21. The spring rests on a pillow 22 supported by the axle. The threaded ends of the U-bolts are received through apertured lugs 23 of a clamp-plate 24, extending crosswise under the axle, nuts 25 being threaded about the threaded ends of said U-bolts for clamping the parts rigidly together.

The spring is represented as a spring of single curvature, whose concave side is presented upwardly. The leaves of the spring increase in length in upward progression, the upper leaves being the longest and the leaves therebelow decreasing successively. The upper faces of the outer ends of the spring form upwardly presented concave contact-faces 31.

Blocks 33 are rigidly secured to the chassis, as by rivets 34. The respective blocks comprise brackets 35. The bracket 35 has a downwardly presented convex contact-face, preferably having a plurality of curvatures, exemplified as a downward convex face 37 of less curvature and a downward convex face 38 of greater curvature, the curvatures merging into each other. These curvatures are similar to the curvature of the upwardly presented concave contact-face of the outer end of the spring, that is to say; the coacting faces are curved in the same general directions, and the respective curvatures of the block are greater curvatures than said curvature of said upwardly presented concave contact-face of the outer end of the spring.

The outer end of the curved face of the block, that is, the end toward the end of the spring, is also preferably higher than the inner end of said curved face of the block, and the outer end of the curved face of the block is preferably of less curvature than the inner end thereof, for purposes to be presently described.

The block is preferably a hollow structure provided with a cavity 41 having curved and converging end walls 42, an upper brace-wall 43, a downwardly presented bracket wall 35', an outer wall 44, a side flange 45, and a bottom flange 46. The rivets 34 are received through holes in the web 47 and one of the wings 48 of the channel-bar 12 and holes in said flanges 45 and 46. The structure of the block forms an exceptionally strong block of comparatively light weight.

When the vehicle is under no-load condition, the outer end of the downwardly presented contact-face of the block preferably rests upon the outer end of the upwardly presented contact-face at the outer end of the spring, forming a line contact 51 between said contact-faces at the outer end of the spring.

In this relation, as exemplified in Fig. 1, the outer ends of the contact-faces are, in effect, nearly parallel in the direction of length of the spring, and the contact-line between the block and the spring is at that portion of the spring which is most resilient, so that under such no-load conditions, the yield of the spring is ready and automatically easily obtained, and, the riding of the vehicle is easy, undue vibration of the vehicle is avoided, and ready yielding of the body of the vehicle is obtained.

As the load increases, the contact-line between the downwardly presented curved contact-face of the block and the upwardly presented curved contact-face of the spring, moves inwardly, that is, away from the outer end of the spring, so that the load-line of the body of the vehicle upon the spring is nearer the heavy portion of the spring, for instance, as shown in Fig. 2.

It will be noted that under full-load relation exemplified in Fig. 2, the said contact-line will have moved inwardly away from the outer end of the spring so as to pass the middle portion of said lower contact-face of the block, and specifically pass from the portion of the downwardly presented contact-face of less curvature 37 to the portion 38 of greater curvature of said contact-face, the direct pressure of the load being received by additional leaves of the spring. The ratio of inward movement of the contact-line decreases under the heavy load conditions under which the contact-face of greater curvature 38 coacts with the contact-face on the spring.

By means of my improved construction, a great resistance range in the spring is obtained, from no-load relation, in which the spring is very resilient, to full-load relation, in which the spring has great resistance. It will be further noted that by reason of the similar curvatures between the contact faces and the relations between said curvatures whereby the curvature of the contact-face of the block is greater than the curvature of the contact-face of the spring and increases toward its inner end, the distance between the contact line of said contact-faces under no-load condition and the contact-line between said contact-faces under full-load conditions, extends throughout a comparatively great portion of the end of the spring, so that a great range of resistance progressively accommodates great differences in load.

The inner end of the contact-face of the block is of greater curvature than the outer end, so that under excessive load conditions occasioned for instance by the wheel on the fully loaded vehicle dropping into a hole, which would bend the outer ends of the spring downwardly lower than the axle, there is a more abrupt curvature of the contact-face of the block presented to the spring, to make the range of line-contacts during such excessive load condition upon the heavier portions of the spring less than the range of line-contacts during usual load conditions.

Suitable means may be provided to obtain stability between the axle and body, lengthwise of the body, as by a suitable radius rod 53, which has articulation 54 with a lug 55 of the axle mounting at one end thereof, and is at its other end secured to the body in well-known manner not further shown or described because well-known.

In order to prevent excessive rebound between the spring and the body, a pin 57 is secured to an apron 58 of the block 33, so as to limit the rise of the body with relation to the spring, this pin being arranged to strike the bottom of the spring for insuring return of the body in proper relation to the spring.

The inner edge of the spring is arranged to be guided by the outer side face of the outer wall 44 of the block, there being such side faces oppositely presented at opposite sides of the body for coacting with the inner edges of the springs.

The spring is shown as double ended in the drawings, projecting to both the front and rear of the axle, although it is obvious that the spring may have only one end projecting toward the front or rear of its wheel-support, or that the parts may be reversed, without departing from the spirit of my invention within the scope of the appended claims.

My improved spring mounting is exemplified in connection with a so-called motor-truck, but is applicable to other vehicles.

The curvature relations between the contact-face on the body and the spring contact-face, and the shifting of the contact-lines therebetween under varying load conditions, is also such as to minimize friction between the parts, as the contacts between said contact-faces are on contact-lines throughout, and said contact-lines move inwardly or away from the end of the spring substantially simultaneously on both said contact-faces as the load increases, and move substantially simultaneously outwardly or toward the end of the spring as the load decreases, in simulation of a rolling motion between said contact-faces, whereby wear of said contact-faces is minimized, there being however a very slight lateral movement between the contact-lines on said respective contact-faces due to the straightening and bending of the spring under varying load conditions, which however cause only negligible wear if any wear is resultant therefrom.

Having thus fully described my invention, what I claim as new, and desire to secure by Letters Patent, is:—

1. In a spring mounting for a motor vehicle, the combination with the chassis and the axle, of a spring of single curvature whose concave side is presented upwardly and whose outer end forms an upwardly presented concave contact-face; means for securing said spring to said axle, a block, and means for securing said block to said chassis, said block provided with a downwardly presented convex contact-face having an outer portion of less curvature coacting with the outer end of said upwardly presented concave contact-face of said spring during lighter load conditions, and an inner portion of greater curvature coacting with an inner portion of said upwardly presented concave contact-face of said spring during heavier load conditions, said convex contact-face being of greater curvatures than the curvature of said coacting concave contact-face, said curvatures extending in the same general directions, and said downwardly presented convex contact-face of different curvatures coacting with said upwardly presented concave contact-face of said spring by means of varying line-contacts between said faces varying automatically with load conditions.

2. In a spring mounting for a motor vehicle, the combination with the chassis and the axle, of a spring of single curvature whose concave side is presented upwardly, and whose outer end forms an upwardly presented concave contact-face, means for securing said spring to said axle, a block, and means for securing said block to said chassis, said block provided with a downwardly presented convex contact-face having an outer portion of less curvature coacting with the outer end of said upwardly presented concave contact-face of said spring during lighter load conditions, and an inner portion of greater curvature coacting with an inner portion of said upwardly presented concave contact-face of said spring during heavier load conditions, said convex contact-face being of greater curvatures than the curvature of said coacting concave contact-face, said curvatures extending in the same general directions, and said downwardly presented convex contact-face of different curvatures coacting with said upwardly presented concave contact-face of said spring by means of varying line contacts between said faces varying automatically with load conditions, and the end of said downwardly presented convex curvature toward the outer end of said spring being higher than the end of said downwardly presented convex curvature distanced from the outer end of said spring.

3. In a spring suspension for a motor vehicle, the combination with the chassis and the axle, of a spring of single curvature whose concave side is presented upwardly and whose outer end forms an upwardly presented concave contact-face, means for securing said spring to said axle, a block having a cavity provided with curved and converging end walls, an upper brace-wall, a downwardly presented bracket, an outer side wall, a side flange and an end-flange, and means for securing said side flange and said end flange to said chassis, said bracket having a downwardly presented convex contact-face coacting with said first-named contact-face, and the inner edges of said spring coacting with said outer side wall for relative location between the same.

In testimony whereof, I have hereunto signed my name.

OTTO ARMLEDER.